United States Patent
Jones et al.

(10) Patent No.: US 9,404,935 B2
(45) Date of Patent: Aug. 2, 2016

(54) METROLOGICAL MECHANICAL COUPLING DEVICES

(71) Applicant: Windspeed Limited, Rhyl (GB)

(72) Inventors: Richard John Parry Jones, Rhyl (GB); David Spencer Dicks, Rhyl (GB); Benjamin James Davies, Rhyl (GB)

(73) Assignee: Windspeed Limited, Rhyl (GB)

( * ) Notice: Subject to any disclaimer, the term of this patent is extended or adjusted under 35 U.S.C. 154(b) by 0 days.

(21) Appl. No.: 14/531,963

(22) Filed: Nov. 3, 2014

(65) Prior Publication Data
US 2015/0153373 A1    Jun. 4, 2015

(30) Foreign Application Priority Data
Nov. 1, 2013  (GB) .................................. 1319384.2

(51) Int. Cl.
| | |
|---|---|
| *G01F 1/58* | (2006.01) |
| *G01P 5/06* | (2006.01) |
| *F03D 11/00* | (2006.01) |
| *F03D 3/00* | (2006.01) |

(52) U.S. Cl.
CPC . *G01P 5/06* (2013.01); *F03D 3/005* (2013.01); *F03D 11/0091* (2013.01); *F05B 2240/216* (2013.01); *Y02E 10/74* (2013.01)

(58) Field of Classification Search
CPC .............. G01F 1/28; G01F 1/22; G01F 1/58; G01P 5/06
USPC ............... 73/861.85, 861.15, 861.75, 861.53, 73/861.74
See application file for complete search history.

(56) References Cited

U.S. PATENT DOCUMENTS

| | | | | |
|---|---|---|---|---|
| 4,938,076 A * | 7/1990 | Buchanan | ................. | G01F 1/28 73/861.53 |
| 5,251,149 A * | 10/1993 | Williams | .................. | G01F 3/12 702/46 |
| 5,704,433 A * | 1/1998 | Bourner | .................. | B25B 23/14 173/178 |
| 5,947,254 A * | 9/1999 | Jones | ...................... | B25F 5/001 192/223.2 |
| 6,604,434 B1 * | 8/2003 | Hamilton | ................ | G01F 1/075 324/207.21 |
| 6,752,026 B1 * | 6/2004 | Hyde | ..................... | G01F 1/586 73/861.15 |

FOREIGN PATENT DOCUMENTS

| | | |
|---|---|---|
| DE | 4338278 A1 | 5/1995 |
| GB | 1418747 A | 12/1975 |

* cited by examiner

*Primary Examiner* — Jewel V Thompson
(74) *Attorney, Agent, or Firm* — Galvin Patent Law; Brian R. Galvin

(57) ABSTRACT

The present invention relates to metrological rotary devices, such as anemometers and the like. Specifically, the present invention relates to a mechanical coupling for the same, whereby an anemometer cup-rotor or like device, can be replaced without the use of a tool. The present invention seeks to provide a coupling device which makes a mechanical coupling between a first and a second member such that the locking together and release action is positive, without likelihood of failure, and can be conducted simply and quickly without the use of a tool. Further objects of the invention are to provide couplings in which a positive axial and rotational location of shaft as first member and mating bore in a second member are obtained which do not cause damage to either of the sliding surfaces when excessive force is applied, and which are capable of transmitting a torque, such couplings being suitable for attaching a rotor to an anemometer. In particular, the present invention provides a coupling arrangement for an anemometer rotating body comprising impellor cups, which impellor cups and rotating body are required for removable fitment, ideally without the use of tools.

17 Claims, 3 Drawing Sheets

METROLOGICAL MECHANICAL COUPLING DEVICES

CROSS-REFERENCE TO RELATED APPLICATIONS

This application is the national stage entry of and claims priority to UK patent application serial number 1319385.9, titled, "IMPROVEMENTS IN OR RELATING TO MECHANICAL COUPLING DEVICES", which was filed on Nov. 1, 2013, the entire specification of which is incorporated herewith by reference in its entirety.

BACKGROUND OF THE INVENTION

1. Field of the Invention

The present invention relates to metrological rotary devices, such as anemometers and the like. Specifically, the present invention relates to a mechanical coupling for the same, whereby a cup-rotor or other similar low torque device, can be replaced without the use of a tool.

2. Discussion of the State of the Art

There are many coupling devices in use in research and industry that transfer rotational mechanical power. Known devices comprise collets and chucks that can be used to attach various metrological devices. Collets whilst being easy to use suffer from being easily being mounted in a non-preferred axial position. Additionally, the fastening of a collet is dependent upon an operator's judgement to apply a correct amount of torque when locking. A chuck can be quite large and are typically metallic whereby, in use, provide a substantial amount of inertial resistance, too great for many applications, including metrology, especially in wind speed applications.

Figure 1:
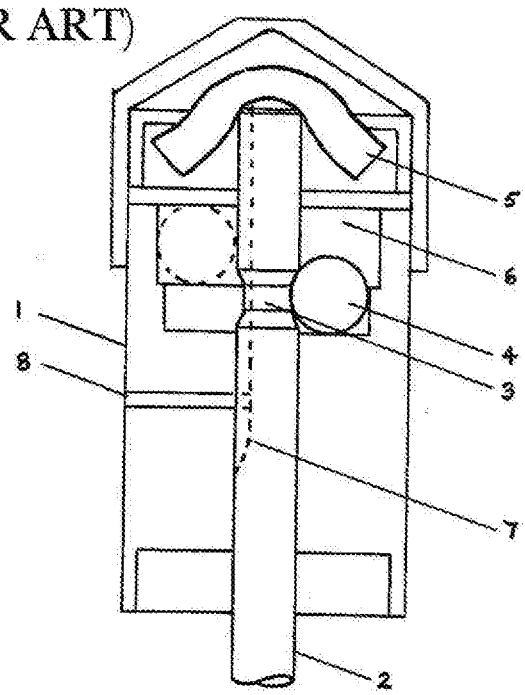

FIG. 1 shows a prior art system, per GB 1,418,747, a prior art metrological coupling device 1 having a right circular cylindrical chamber with first and a second diameters and a bore, all being concentric with respect to each other, the second diameter being larger than the first diameter. Within the bore, a shaft 2 is a sliding fit, the shaft being operatively positioned therein; the shaft having an annular groove 3 about which the ball can engage, in conjunction with the inside wall of the chamber, about the first diameter, the annular wall of the chamber preventing the relative axial movement of the coupling device with respect to the shaft in one direction and the cap of the coupling device preventing movement in the other axial direction. That is to say, when the ball reaches the position shown by an unbroken line in the drawing further outward movement of the shaft is prevented by the locking action of the ball between the sloping side of the groove and the wall and bottom of the chamber. The shaft is then locked in position in the coupling member and cannot be withdrawn while the coupling remains in the vertical position or thereabouts unless vertical acceleration, vibration or magnetic force is used.

Release of the coupling element is enabled when the ball 4 is within space 6. Upon relative movement of the coupling device away from the shaft, the ball is not obstructed by the annular groove and thereby relative movement between the coupling device and the shaft is not impeded and the components can be separated only when inverted or by the use of strong external magnets. The longitudinal slot 7 in the shaft and engaging pin are used when it is required to prevent relative angular rotation of the two members of the coupling. More than one ball may be present in the chamber.

This prior system, however, suffers from a number of issues, one of which is that the coupling is not balanced about the central axis, which can compromise data when employed in a metrological application.

DE4338278 relates to a device 20 (per FIG. 2) for locking an axially movable securing pin or bolt 22 by the use of a solenoid 23 in a missile environment, where there is an extreme requirement for a high functional reliability. Specifically, this utility model provides a means for locking the axially movable securing pin or bolt by a ball bearing 27 element, which engages in a locking groove 28 on the circumference of the securing bolt by means of a locking ball 27. The solenoid drives a piston 26 via rod 25 within channel 27, the piston being movable so as to enable locking of the shaft 22 by means of the ball bearing. However, this system relates to a remote, electrically controlled arrangement that cannot be utilised in a rotational coupling arrangement.

OBJECT TO THE INVENTION

The present invention seeks to provide a coupling device which makes a mechanical coupling between a first and a second member such that the locking together and release action is positive, without likelihood of failure, and can be conducted simply and quickly without the use of a tool. The invention also seeks to provide couplings in which a positive axial location of shaft as first member and mating bore in a second member are obtained which do not cause damage to either of the sliding surfaces when excessive force is applied, and which are capable of transmitting a torque, such couplings being suitable for attaching a rotor to an anemometer. The invention also seeks to provide couplings, which can be coupled and uncoupled without the use of tools. The present invention further also seeks to provide an improved anemometer for meteorology applications, which overcomes at least some of the problems that have become apparent with regard to known systems.

SUMMARY OF THE INVENTION

In accordance with a first aspect of the invention, there is provided an axial coupling arrangement between a first and second elements, said elements being arranged for rotation about an axis, the first element comprising a general elongate shaft, having a proximal end and a distal end, with a locating or engagement portion upon an external surface thereof; the second element comprising a body in which a bore in which the distal end of the shaft is received, the bore connecting with an internal chamber, wherein the internal chamber is provided with a locking member movable between first and second stable positions, corresponding to an unlocked or disengaged state and a locked or engaged state, as between the first and second elements; wherein a biasing element is operable to enable or to actuate movement of the locking element between first and second stable states, wherein in the second state, the locking element extends from the internal chamber into the aperture, whereby to locate or engage with the locating or engagement portion of the first element, whereby to prevent relative axial movement between the first and second elements. Conveniently, the locking element moves from the unlocked position to the locked position under the force of gravity. For example, and preferably with reference to a position indicator, to unlock the two components apart, the engagement portion of the shaft is brought to overlie the internal chamber of the second element. The cap and therefore the resilient member is depressed, the shaft member with the locking member in the engaged state allows the locking member to be released under the force of gravity. The locking member, now clear of the engagement portion, enables the resilient cap and therefore the resilient member to be relaxed whereby the two parts are no longer coupled and the second element can be withdrawn from the distal end of the first, shaft element.

Conveniently, the locking element moves from a locked position to an unlocked position under the force of gravity. For example, and preferably with reference to a position indicator, to lock the two components together, the second element having the internal chamber with the locking member in the unlocked state is brought towards the shaft member, the resilient member is depressed and as the internal chamber overlies the engagement portion of the shaft, the locking member is operable to descend into the engagement portion; as the forces acting on the resilient member are released, the internal chamber of the second element moves axially towards the distal end of the shaft and the locking element bears against the engagement portion of the shaft and a wall of the internal chamber of the second element, whereby to enable engagement therebetween.

Conveniently, the biasing element is a monostable element—i.e. is stable in one state—comprises a resilient element such as a rubber or rubber like element, a wave-spring or a coil-spring, movable between a non-compressed (or minimally-compressed state) stable state and a compressed state, wherein when in a compressed state, the second element can move relative to the first element whereby to enable passage of the locking member between first and second stable positions, conveniently employing gravity to enable movement of the locking member, this being accomplished without use of tools, thereby making the locking/unlocking operation a simple matter, which can assist in the maintenance of outdoor equipment. In use, devices such as anemometers are placed at the top of towers and like positions at sea and other geographical positions where meteorological data is collected, and as such are subject to the vagaries of weather. It will be appreciated that at times of service or repair, a simple removal of the body from the shaft by a simple removal action—for example by depressing the tip of the body element against the action of a resilient element, when horizontal. In a first alternative, the resilient element comprises a magnetic element, operable to urge two axially arranged elements apart in a first magnetic state and in a second magnetic state, the second element can move relative to the first element whereby to enable passage of the locking member between first and second stable positions. The magnetic element can comprise an electromagnetic element.

The shape of the first element can comprise a number of alternatives, such as a substantially circular right cylindrical element or a tapering substantially circular element. Orientation determining features may be present for all or part of the length of the first element. The locking element can comprise a ball element and is confined in the cavity to move in a single plane between first and second stable positions relative to the rotational axis of the second member, when permitted to so move. The locking element can alternatively comprise a pivot element and is confined in the cavity to move in a single plane between first and second stable positions relative to the rotational axis of the second member, when permitted to so move, the frictional grip between the locking member and the axial forces acting on the one hand from the shaft onto the first part of the locking member and on the other hand from the body onto a second part of the locking member. Applicants have determined, by the use of different biasing forces arising from the resilient elements/biasing member, axial frictional forces can be generated sufficient to prevent slippage under standard operating conditions of such components. That is to say axial coupling torque between 0.005-0.02 Nm can be supported by such a connection in a rotationally balanced fashion without the need for further fastening means.

The engagement portion of the second member can comprise one of an annular groove about the shaft, a single inwardly directed aperture, or plurality of inwardly directed apertures. Conveniently, the second element further comprises one or more further internal chambers about the body, the size and shape of the chambers being dimensioned to provide a balance with regard to rotation movement, taking into account the different densities of the components of the locking members. In the alternative, the second element further comprises a single internal chamber, the chamber being arranged so that movement of the locking member remains substantially in a single radial plane with respect to the axis of rotation of the second body.

In accordance with a general aspect of the invention, the invention provides a coupling arrangement for a rotary device and a spindle supported for rotation. In particular, the present invention provides a coupling arrangement for an anemometer rotating body comprising impellor cups, which impellor cups and rotating body are required for removable fitment, without the use of tools. The present invention can indeed provide for such a requirement, the invention enabling ordinarily vertical, pole mounted anemometers to be brought down so that they lie in a horizontal fashion, the rotating body being operated such that locking mechanism can enable the locking element to be moved under the force of gravity from an engaged or locked state to an unengaged or unlocked state subject to the resilient or biasing element being urged into a state whereby the locking element can be released.

In accordance with a further aspect of the invention, there is provided an anemometer or other rotary electric/electronic rotational speed transducer/encoder which incorporates such a coupling.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

Figure 2:
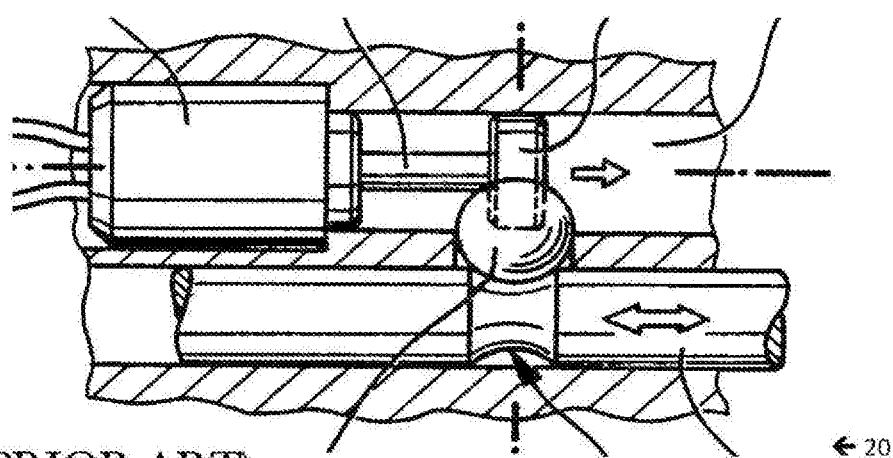
Figure 3:
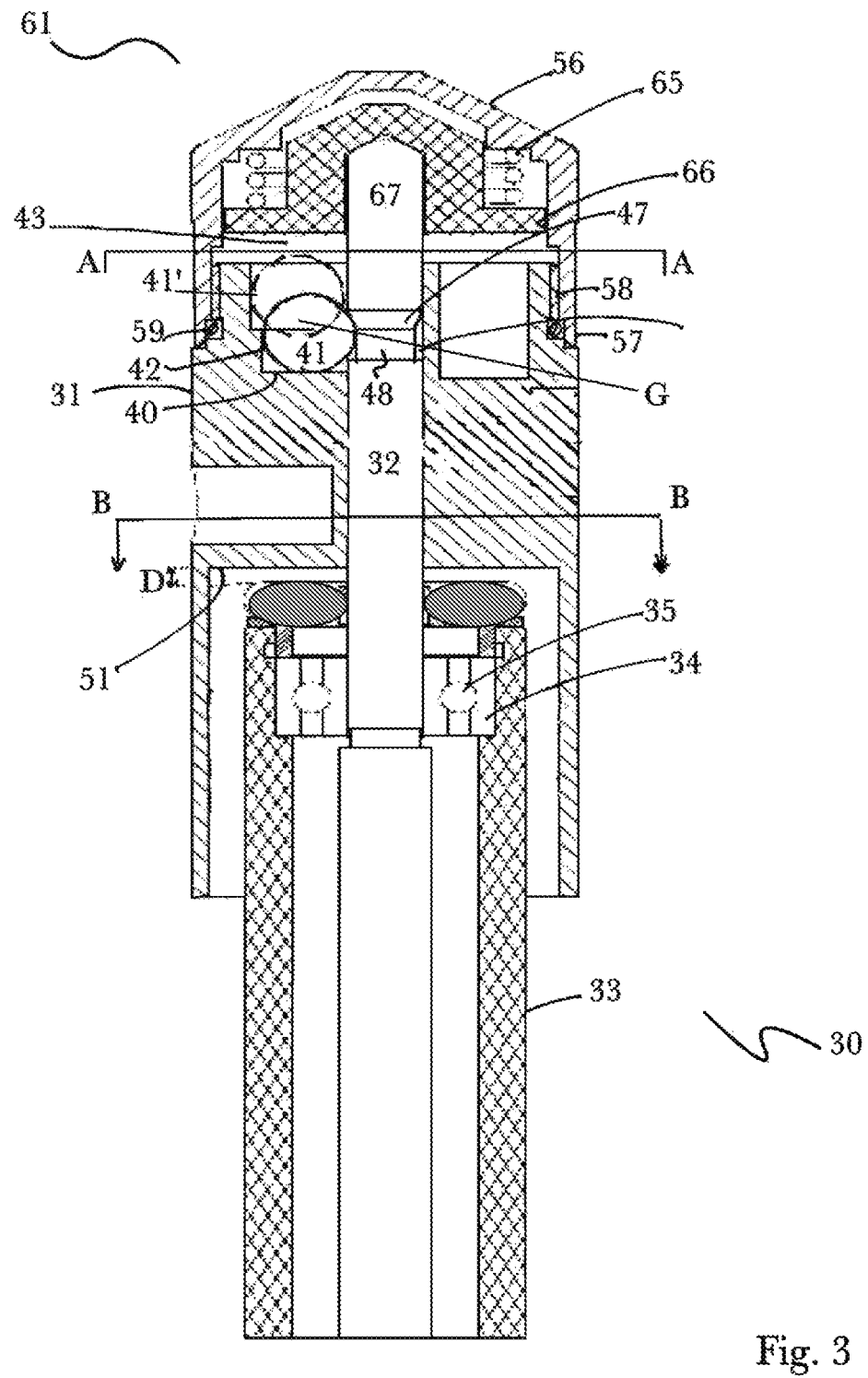
Figure 4A:
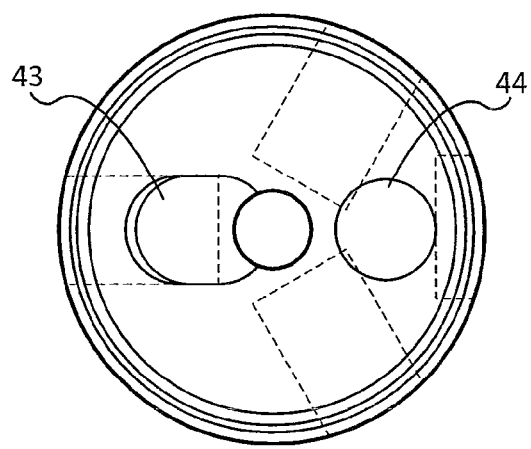
Figure 4B:
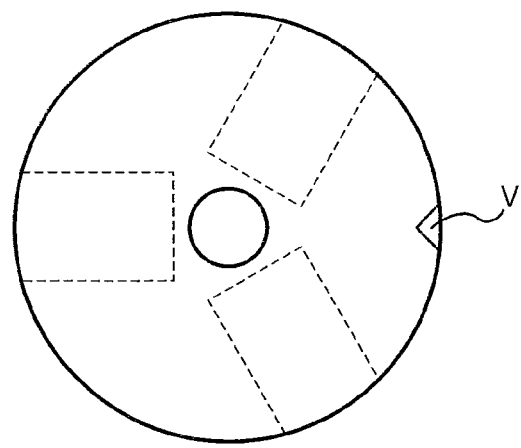
Figure 5:
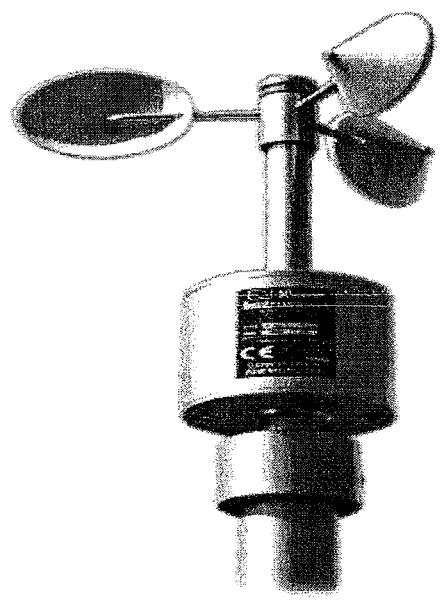

FIG. 1 shows a prior mechanical coupling device;
FIG. 2 shows a prior electro-mechanical coupling device;
FIG. 3 shows an axial sectional view through the coupling arrangement;
FIGS. 4a & 4b show sections tangential with respect to the axial representation in FIG. 3, across lines A-A' and B-B'; and,
FIG. 5 shows an anemometer with a disc generator in accordance with the invention.

DETAILED DESCRIPTION

There will now be described, by way of example only, the best mode contemplated by the inventor for carrying out the present invention. In the following description, numerous specific details are set out in order to provide a complete understanding to the present invention. It will be apparent to those skilled in the art, that the present invention may be put into practice with variations of the specific.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

An embodiment of the invention will now be described with reference to FIG. 3, which comprises a first coupling arrangement 30 in accordance with the invention, in section. A first coupling member 31 is mounted with respect to drive shaft 32, which shaft is mounted for rotation with respect to shaft enclosure 33 by means of bearing 34, having ball bearings 35 mounted therein.

Turning now to the coupling element 31 in more detail, the generally right circularly cylindrical body is provided with an axial cylindrical channel 55 to enable passage of the circular section shaft 32 therethrough, conveniently by way of a sliding fit. Upon fitment, the shaft is conveniently introduced through an aperture in the proximal inside face 51 of the coupling element, the shaft extending through the channel such that it extends beyond the distal end of the main body of the coupling element.

A cap 56 is associated with a distal end 61 of coupling element 31, generally in the shape of a truncated cone having a circular symmetry with a hollow interior to define a skirt element 57 having an internal screw thread 58 which enables the cap to be retained in a screw-fastened sense with respect to corresponding external screw thread associated with the main body of the coupling element, an O-ring 59 also being present to ensure that dirt etc. cannot interfere with the operation of the locking mechanism, to be described below. Metal-to-metal locking compounds can also be used to ensure that the inside is not tampered with by unauthorised persons. The leading edge of the skirt abuts against an annular seat associated with the distal portion of the coupling element. Within the inside of the cap, there is a resilient element 65, shown as a conventional coil spring in the section, but in fact can conveniently be in the form of a multi-layer wave washer, preferably a stainless steel spring element, whereby the advantages of longer life and wider temperature range can be demonstrated over, for example, a rubber/polymeric resilient member. The washer abuts, at a distal end, against an inside face of cap 56 and at a proximal end abuts against a shaft cap 66 comprising a general top-hat configuration, conveniently having a circular symmetry with a brim which receives the resilient element on a first side and has a recess on a second side, the recess corresponding in shape to receive a distal end 67 of spindle 32.

The force required to depress the cap against the resilient member is conveniently in the range of 10-20N, although the force could be larger, say 100N to provide a transfer of greater rotational torque as between the first and second coupling elements. The requirement to exert such a force needs to be balanced by the ability of a person to apply such a force, bearing in mind that the fitment of such a device in a meteorological situation will require the anemometer to be lowered such that it is horizontal, whereby gravitational forces can enable the locking member to drop into an unlocked position, when the indicator V is uppermost. It will be appreciated, that in order to enable the coupling member to be attached, then the indicator V must be directed lowermost, whilst the shaft is horizontal. It is noted that in prior devices, attachment was only possible, when the shaft was vertically upright.

As shall be discussed below, a change in the state of the locking mechanism is enabled by moving the cap 56 in the direction of the spindle, whereby the coupling element can be brought toward the distal end of shaft enclosure 33 and seal arrangement 36—which is separated by a distance D, the movement towards the shaft enclosure being resisted by resilient member 65.

Within the body of the coupling element 31 there is a cavity 43 in which is placed a locking member 41, which is restricted in movement such that it can effectively move only parallel/diagonally with respect to the spindle axis, but not angularly with respect to a plane with respect to said axis, and can move between a first unlocked position and a second locked position—with respect to the coupling element 31 and spindle 32. Reference numeral 41' shows the locking member in a position to enable decoupling of the two components (or as the locking members are brought together). The spindle 32 has a necked-in section 45 arranged such that when the coupling element 31 has been brought toward the spindle support, the locking member can move between said first unlocked position and said second locked position, the arrangement being such that the necked in section is dimensioned to prevent movement of the locking member when in the locked position, to prevent removal of the coupling member 31 from the spindle, and when in the first unlocked position is prevented from engaging with the necked in section whereby to allow removal of the coupling member 31 from the spindle.

The functioning of the coupling arrangement shall now be discussed with reference to FIGS. 3 and 4*a*. FIG. 3 shows a necked-in portion 45 of spindle 32, including a lower lip 46 and an upper bevel surface 47. FIG. 4*a* is a sectional view of across line A-A' of FIG. 3, which is a distal section of the coupling arrangement with the shaft. The sectional view shows first and second cavities, 43 and 44 respectively. Cavity 43 is generally oblong/elliptical in shape in this embodiment, where the locking members comprise steel balls, which are readily available in a large number of sizes when sold as ball bearings. The width of the cavity 43 generally corresponds to the diameter the ball bearing locking member, whereby to allow movement of the ball bearing within the cavity—the width is effective about a radial axis of the coupling member and spindle—whereby to enable movement of the locking member between locked and unlocked positions. That is to say, the distance G between the bevel and the wall 40 of the cavity 43 corresponds to at least the diameter of the ball bearing, d, which can conveniently be a 4 mm ball bearing, which is standard dimension and accordingly such ball bearings are readily available from appropriate supplies. Downward travel is constrained by floor 42 of cavity 44. Applicants have determined that this low torque coupling (e.g. 0.005-0.02 Nm) can be provided without further fastening means to ensure simultaneous movement of the coupling element 31 and shaft 32, whereby to enable simple tool-less changes of components. By increasing the biasing force of the resilient element, an increase in torque value can be provided. It will be appreciated that the locking member could comprise other shapes. For example, the member could be a pivotable member, being pivotable between first and second positions, corresponding to locked and unlocked positions, although the torque limits will not necessarily be quite so straightforwardly determined. The length of the pivot member (for a pivot having a generally circumferentially arranged about an annulus within the cavity 43) corresponding such that it would engage within the necked-in portion 45, yet be less than the distance G when the coupling member has been depressed towards the spindle support member 33. Equally, the width of the slot for the locking member needs to be slightly larger than the width of the locking member itself, whether it is a pivoting toggle element, a roller element (as are available from roller bearing supplies) or other variations. Other types of locking elements can simply be conceived by those skilled, for example a tumbler element could move between first and second, locked and unlocked, positions. The necking element is generally shown as being an annular arrangement about the shaft. The exact shape of a locking element can be various, but it must be able to be retained in first and second positions; when in a locked position enable forces to be transmitted to ensure frictional grip between the locking member and an engagement surface of the engagement portion of the shaft.

In the locked position, the locking member 41 lies substantially adjacent or is in touching contact with an axial wall part 40 of the cavity 43 whereby axial movement toward the proximal portion of the spindle is prevented and axial movement toward the distal section of the spindle is limited by bevel surface 47. When the coupling member is moved against the resilient element, toward the spindle support member 33, the distance D between the respective members is reduced. Simultaneously, the gap between the bevel section 47 and the floor 40 of the cavity 43 is increased enabling passage of the locking member—subject to the action of another force, such as gravity—in the example of an anemometer housing, a supporting mast, for example, is lowered, enabling the anemometer housing to be brought to a substantially horizontal position, whereby the ball bearing or other type of locking member can be brought into a unlocking position (see position of locking member with regard to reference numeral 41') so that the coupling member can be removed from the spindle. Conveniently, the necked-in portion of the shaft has a bearing face which is angled such it presents a bevel face in a normal direction to a face of the coupling member; where it is a ball, the bearing face of the necked-in portion acts towards the centre of the ball; equally the bearing face of the cap member is directed to transmit an axial force—arising from the resilient element—through the coupling member, whereby to ensure a suitable coupling force acts through the coupling member whereby to maximize the coupling torque through the device. Conveniently, it has been found for a nominal 4 mm ball bearing, that an angle in the range of 10°-30° to the axis of rotation has been found to work well; different diameters of ball bearing may operate with differing preferred values of a bevel angle or taper. In the alternative, the surface 47 could be a curved surface around the spindle.

The generally right circularly cylindrical body is provided with an axial cylindrical channel 55 to enable passage of the circular section shaft 32 therethrough, conveniently by way of a sliding fit. Upon fitment, the shaft is conveniently introduced through an aperture in the proximal inside face 51 of the coupling element, the shaft extending through the channel such that it extends beyond the distal end of the main body of the coupling element.

As previously mentioned, the assembly can be made to balance by means of the second cavity/drill hole opposite the ball cavity. It will also be realised that instead of a single cavity 44 opposite cavity 43, there may be two equally spaced cavities arranged, for example 120° to one another. In the limit, there could be arranged a single cavity, with the locking member being constrained to move only in a specific direction in a single plane relative to the axis (i.e. movement not being in an arc about the axis of the coupling member/spindle), with the cavity shaped such that the body is balanced with respect to rotational movement.

A significant advantage of the present invention is that locking and unlocking of the coupling member is possible with the spindle and coupling member arranged at the horizontal, as opposed to prior systems, where it was typically preferred to reduce the angle so that for simple removal of the coupling member, the coupling element and spindle, in actual fact pointed downwardly, for example 90° to the vertical. Given that wind turbines and meteorological apparatus tend to be positioned/mounted in awkward to access sites, this could prove to be quite difficult, with danger to personnel. Horizontal locking is particularly useful where an anemometer assembly is used on a cup-rotor as part of an anemometer to be fitted to a tower/mast which is assembled horizontally along the ground before being lifted to the vertical position and erected by the use of guy ropes.

Referring again to FIG. 3, there is shown, between the spindle support member 33 and the proximal face of the coupling body, a seal that has been developed to address certain problems arising from the ingress of moisture. It will be realised, to enable the spindle to be supported with as little resistance to rotation as possible, that the bearing support is of extremely low resistance. Thus roller bearings are not used and instead ball bearings are employed. Ceramic bodies with a minimum of lubricant are also preferred. In fields of metrology, in particular in the specific use of anemometers, water ingress must be prevented, not only due to the interference with any oil in the bearings, but also due to the fact that the water can freeze. It will be appreciated that extreme diurnal temperature variations can occur, especially in tropical and/or mid-continent regions, where temperature variations and differing levels of humidity from super saturated to 50% saturation can affect mechanical bearings too easily, taking into account the fact that a bearing seal will not be in touching contact of a rotating spindle, so as to reduce any effects, which are especially noticeable upon initial movement from a resting condition.

FIG. 5 shows an anemometer with a 3-cup wind-driven impellor, as an example of an application of the present invention. The impellor provides a rotational drive, through a shaft, whereby to enable measurement of rotational speed and thereby enable wind speed to be calculated. In use, airflow past the impellor cups in any horizontal direction turn the shaft in a manner that was proportional to the wind speed. Therefore, counting the turns of the shaft over a set time period produced the average wind speed for a wide range of speeds. An alternating voltage signal can be produced, and a change in the voltage can be utilised to assist in the determination of the rotational speed of a stator. The ratio of the speed of the wind and that of the cups, the anemometer factor, depends on the dimensions of the cups and arms, and may have a value between two and a little over three. It will be appreciated that an optoelectronic tachometer arrangement could operate in a similar fashion. Such optoelectronic tachometers can measure the rotational speed of a spindle by attaching a rotating tachometer member to the spindle. The rotating tachometer member having a body with, for example, one mirror so as to enable a stationary light source and light receiver to be able to determine a rate of rotation. Whilst gravitational forces can be used to enable the locking member to drop into an unlocked state, the coupling member can still be used in a horizontal axis of operation, since not only does the cap member need to be depressed, the orientation of the coupling members must be such that the unlocking operation is enabled.

For applications that include meteorological use, it will be appreciated that the materials selected are suitable weather resistant. The coupling member, for anemometer uses will need to have a low mass so that torque issues required to overcome a starting inertia are minimised. Accordingly an aluminium alloy, such as a 6000 series grade of aluminium has been found to be suitable, with anodising performed upon suitably prepared finish, with no scratches or blemishes, and all external surfaces free of sharp edges and burr-free. The shaft can conveniently be manufactured with from a stainless steel, for example a 303-grade stainless steel or, in particularly hostile environment 316-grade, a grade suitable for marine environments.

The skilled person will be aware of a range of possible modifications of the various embodiments described above. Accordingly, the present invention is defined by the claims and their equivalents.

What is claimed is:

1. A metrological axial coupling arrangement between a first element and a second element, the elements arranged for rotation about an axis, the first element comprising a general elongate shaft, having a proximal end and a distal end, with a locating or engagement portion upon an external surface thereof;
   the second element comprising a body having a bore in which the distal end of the shaft is received, the bore connecting with an internal chamber,
   wherein the internal chamber is provided with a locking member movable between first and second stable positions, corresponding to an unlocked or disengaged state and a locked or engaged state, as between the first and second elements;
   wherein a biasing element is operable to enable or to actuate movement of the locking element between first and second stable states
   wherein in the second state, the locking element extends from the internal chamber into the aperture, whereby to locate or engage with the locating or engagement portion of the first element, whereby to prevent relative axial movement between the first and second elements.

2. A metrological arrangement according to claim 1 wherein the locking element is operable to move from an unlocked position to a locked position under the force of gravity, when the second element having the locking member within the internal chamber, in the unlocked state, overlies the engagement portion of the shaft member lies below, such that upon operation of the biasing member, the locking member can descend into the engagement portion.

3. A metrological arrangement according to claim 1 wherein the locking element is operable to move from the locked position to the unlocked position under the force of gravity when the engagement portion of the shaft is brought to overlie the internal chamber of the second element and when there are forces acting on the resilient member.

4. A metrological arrangement according to claim 1, wherein the biasing element comprises a resilient element, movable between a non-compressed stable state and a compressed state, wherein when in a compressed state, the second element can move relative to the first element whereby to enable passage of the locking member between first and second stable positions.

5. A metrological arrangement according to claim 1, wherein the biasing element comprises a magnetic element, operable between a first magnetic state and a second magnetic state, wherein when in a second magnetic state, the second element can move relative to the first element whereby to enable passage of the locking member between first and second stable positions.

6. A metrological arrangement according to claim 1, wherein the biasing element comprises a magnetic element, operable between a first magnetic state and a second magnetic state, wherein when in a second magnetic state, the second element can move relative to the first element whereby to enable passage of the locking member between first and second stable positions, wherein the biasing magnetic element is an electromagnetic element.

7. A metrological arrangement according to claim 1, wherein the first element comprises a substantially circular right cylindrical element.

8. A metrological arrangement according to claim 1, wherein the first element comprises a tapering substantially circular element.

9. A metrological arrangement according to claim 1, wherein the locking element comprises a ball or roller element and is confined in the cavity to move in a single plane between first and second stable positions relative to the rotational axis of the second member, when permitted to so move.

10. An axial coupling arrangement according to claim 1, wherein the locking element comprises a pivot element and is confined in the cavity to move in a single plane between first and second stable positions relative to the rotational axis of the second member, when permitted to so move.

11. An axial coupling arrangement according to claim 1, wherein the engagement portion of the second member comprises an annular groove about the shaft.

12. An axial coupling arrangement according to claim 1, wherein the engagement portion of the second member comprises a single inwardly directed aperture.

13. An axial coupling arrangement according to claim 1, wherein the engagement portion of the second member comprises a number of inwardly directed apertures.

14. An axial coupling arrangement according to claim 1, wherein the second element further comprises one or more further internal chambers about the body, the size and shape of the chambers being dimensioned to provide a balance with regard to rotation movement, taking into account the different densities of the components of the locking members.

15. An axial coupling arrangement according to claim 1, wherein the second element further comprises a single internal chamber, the chamber being arranged so that movement of the locking member remains in a single radial plane with respect to the axis of rotation of the second body.

16. A metrological device comprising an axial coupling arrangement according to claim 1.

17. An anemometer arrangement comprising an axial coupling arrangement according to claim 1.

* * * * *